United States Patent [19]
Carpenter

[11] 3,778,627
[45] Dec. 11, 1973

[54] HIGH INTENSITY, PULSED THERMAL NEUTRON SOURCE

[75] Inventor: John M. Carpenter, Ann Arbor, Mich.

[73] Assignee: The United States of America as represented by the United States Atomic Energy Commission, Washington, D.C.

[22] Filed: Apr. 17, 1973

[21] Appl. No.: 351,893

[52] U.S. Cl. .................. 250/499, 250/502, 250/518
[51] Int. Cl. ............................................... G21g 3/04
[58] Field of Search .................... 250/499, 500, 501, 250/502, 518, 393

[56] References Cited
UNITED STATES PATENTS

| | | | |
|---|---|---|---|
| 2,253,035 | 8/1941 | Kallmann | 250/499 |
| 3,345,515 | 10/1967 | Adachi | 250/499 |
| 3,349,001 | 10/1967 | Stanton | 250/499 |

Primary Examiner—James W. Lawrence
Assistant Examiner—T. N. Grigsby
Attorney—Roland A. Anderson

[57] ABSTRACT

This invention relates to a high intensity, pulsed thermal neutron source comprising a neutron-producing source which emits pulses of fast neutrons, a moderator block adjacent to the fast neutron source, a reflector block which encases the fast neutron source and the moderator block and has a thermal neutron exit port extending therethrough from the moderator block, and a neutron energy-dependent decoupling reflector liner covering the interior surfaces of the thermal neutron exit port and surrounding all surfaces of the moderator block except the surface viewed by the thermal neutron exit port.

14 Claims, 4 Drawing Figures

PATENTED DEC 11 1973 3,778,627
SHEET 1 OF 2
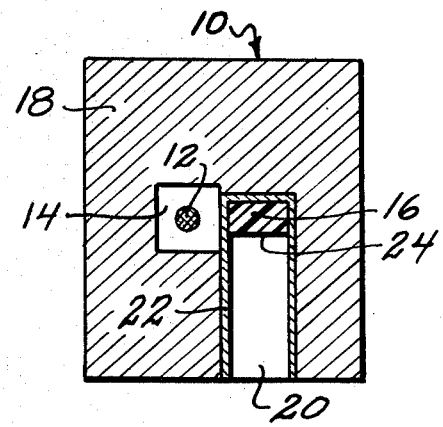
Fig—1
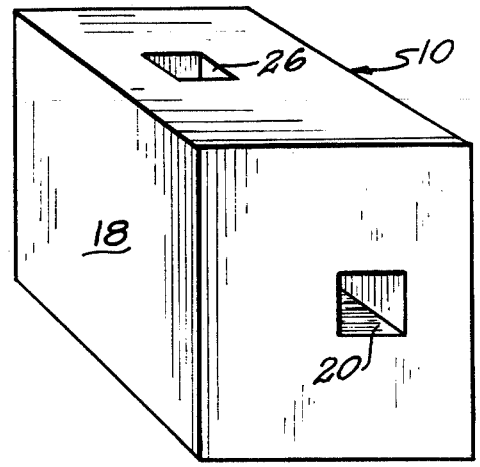
Fig—2
0.5 GeV Protons
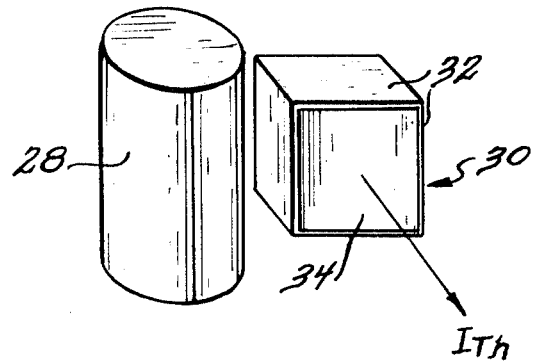
Fig—3

HIGH INTENSITY, PULSED THERMAL NEUTRON SOURCE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates generally to neutron sources and more particularly to pulsed thermal neutron sources. Specifically, this invention is concerned with a novel apparatus for slowing down fast neutrons in such a manner as to create highly intense pulses of thermal neutrons.

Use of neutrons in research and development has grown immensely in importance, and applications of both fast and thermal neutrons have ranged from pure to applied research as well as in such direct applications as with nuclear reactors and nuclear medicine. In order to obtain beams of neutrons, both fast and thermal as well as steady and pulsed, nuclear reactors have been built in the past specifically for this purpose. Some examples of such facilities are the High Flux Isotope Reactor at Oak Ridge National Laboratory which provides a thermal neutron beam source flux of $1.0 \times 10^{15}$ neutrons (n)/cm$^2$-sec, the High Flux Beam Reactor at Brookhaven National Laboratory which produces a thermal neutron beam source flux of $5.0 \times 10^{14}$ n/cm$^2$-sec, and the German-French high flux reactor at the von Laue-Langevin Institute at Grenoble which provides a thermal neutron beam source flux of $1.0 \times 10^{15}$ n/cm$^2$-sec. Unfortunately, advances in the neutron flux provided by such reactors have slowed as the reactor designs have approached their limits imposed by heat transfer and operating costs.

A new generation of neutron sources, however, is being developed whereby the costs of building, operating and maintaining a steady-state nuclear reactor are not required. These sources utilize pulsed reactors or various types of accelerators to produce both fast and thermal neutron beams. A few examples of these are the SORA pulsed reactor which would be expected to produce a neutron beam source flux of $1.0 \times 10^{15}$ n/cm$^2$-sec, the BPFR at Brookhaven National Laboratory which would be expected to provide a neutron flux greater than $10^{15}$ n/cm$^2$-sec, the Canadian Intense Neutron Generator which would be expected to produce a steady neutron flux of $1 \times 10^{16}$ n/cm$^2$-sec, and the WNRF at Los Alamos where a neutron flux of about $2 \times 10^{14}$ n/cm$^2$-sec is expected. The inherent qualities of such neutron sources as compared with steady-state nuclear reactors make them highly desirable. Furthermore, the more intense the neutron flux obtainable from such a neutron source is, the more desirable such a source becomes.

The inventor has developed a new approach to the design of pulsed moderators which not only eliminates the need for a nuclear reactor with its associated high costs of construction and operation, but also is capable of obtaining beams of pulsed thermal neutrons of extremely high intensity. Through the use of a fast neutron source and a novel arrangement of a moderator, a reflector and a neutron energy-dependent decoupling reflector liner, this apparatus is capable of providing 60 pulses/sec with the peak thermal neutron flux achievable at the maximum of each pulse being $1.6 \times 10^{15}$ n/cm$^2$-sec. This makes the present invention one of the most intense pulsed thermal neutron sources in the world.

Therefore, it is one object of the present invention to provide a pulsed thermal neutron beam source capable of producing a peak flux of $1.6 \times 10^{15}$ n/cm$^2$-sec.

It is another object of the present invention to provide a novel apparatus for slowing down fast neutrons so as to produce highly intense pulses of thermal neutrons.

Further objects and advantages of the invention will be apparent from the following detailed description of the invention.

SUMMARY OF THE INVENTION

A moderator block constructed from a hydrogenous material such as polyethylene is located adjacent to a pulsed fast neutron source. A reflector block constructed from a material such as beryllium completely encases the fast neutron source and the moderator block except for a thermal neutron exit port which extends through the reflector block from the moderator. The interior surfaces of this port and all surfaces of the moderator except that surface viewed by the port are covered with a neutron energy-dependent decoupling reflector liner made from a material such as cadmium.

When this apparatus is in operation, pulses of fast neutrons radiate outwardly from the fast neutron source. A portion of the fast neutrons from each pulse strike the moderator and become thermalized therein, the moderator emitting neutrons in the thermal energy ranges starting about 3 $\mu$sec after the fast neutrons from each pulse strike the moderator. The purpose of the reflector block is to enhance the intensity of the emerging pulsed thermal neutron beam by partially thermalizing those fast neutrons which do not initially enter the moderator and deflect a portion thereof back into the moderator. In addition, the reflector block partially thermalizes and reflects back to the moderator fast neutrons which pass unthermalized through the moderator. Since a short pulse width of only 30 $\mu$sec for each emerging thermal neutron pulse is desired, these fast neutrons which are partially thermalized in the reflector block and then deflected back into the moderator must be so deflected within about 15 $\mu$sec. Otherwise, the resultant thermal neutron pulse width will be considerably greater than 30 $\mu$sec.

Since neutrons thermalized in the reflector block have long lifetimes therein inasmuch as they can remain in the reflector block for a matter of milliseconds, and since neutrons thermalized within the moderator have a very short lifetime of about 30 $\mu$sec, a neutron energy-dependent decoupling reflector liner is placed, as described above, around the moderator. This reflector liner "decouples" the reflector block from the moderator in that only neutrons having an energy at or greater than a certain threshold or "decoupling" energy are transmitted through the reflector liner, while neutrons having energies below this decoupling energy level are captured and absorbed by the reflector liner, thereby preventing them from entering the moderator block. This decoupling energy is chosen so that the slowing-down time to the decoupling energy for neutrons in the reflector block is less than the moderator response time and is that particular energy to which neutrons will be slowed down by the reflector block in 15 $\mu$sec if the total moderator response time, and therefore the thermal neutron pulse width, is about 30 μsec. Therefore, neutrons which have been slowed down in the reflector block for a sufficient period of time so that their energies are less than the decoupling energy before being reflected back to the moderator cannot pass through the reflector liner and into the moderator, thereby insuring that the resulting thermal neutron pulses from the moderator will be little broadened by the reflected neutrons and will have the desired short pulse width of about 30 μsec. Without such an energy-dependent decoupling reflector liner, neutrons having long lifetimes in the reflector block would continuously be deflected into the moderator, resulting in either very long thermal neutron pulse widths or just a steady thermal neutron beam lacking individual pulses. However, those neutrons which are partially thermalized in the reflector block and deflected back to the moderator within 15 μsec not only create short thermal pulse widths but also complement and increase the resulting thermal neutron pulses, thereby enabling the present invention to achieve high-intensity pulses of thermal neutrons.

BRIEF DESCRIPTION OF THE DRAWINGS

FIG. 1 is a horizontal cross-sectional view of a source-moderator-reflector arrangement with beam port in accordance with the present invention.

FIG. 2 is a three-dimensional outer view of the embodiment illustrated in FIG. 1.

FIG. 3 is a three-dimensional view of one particular arrangement of the fast neutron source, moderator block and reflector liner.

DETAILED DESCRIPTION OF THE INVENTION

Figure 4:
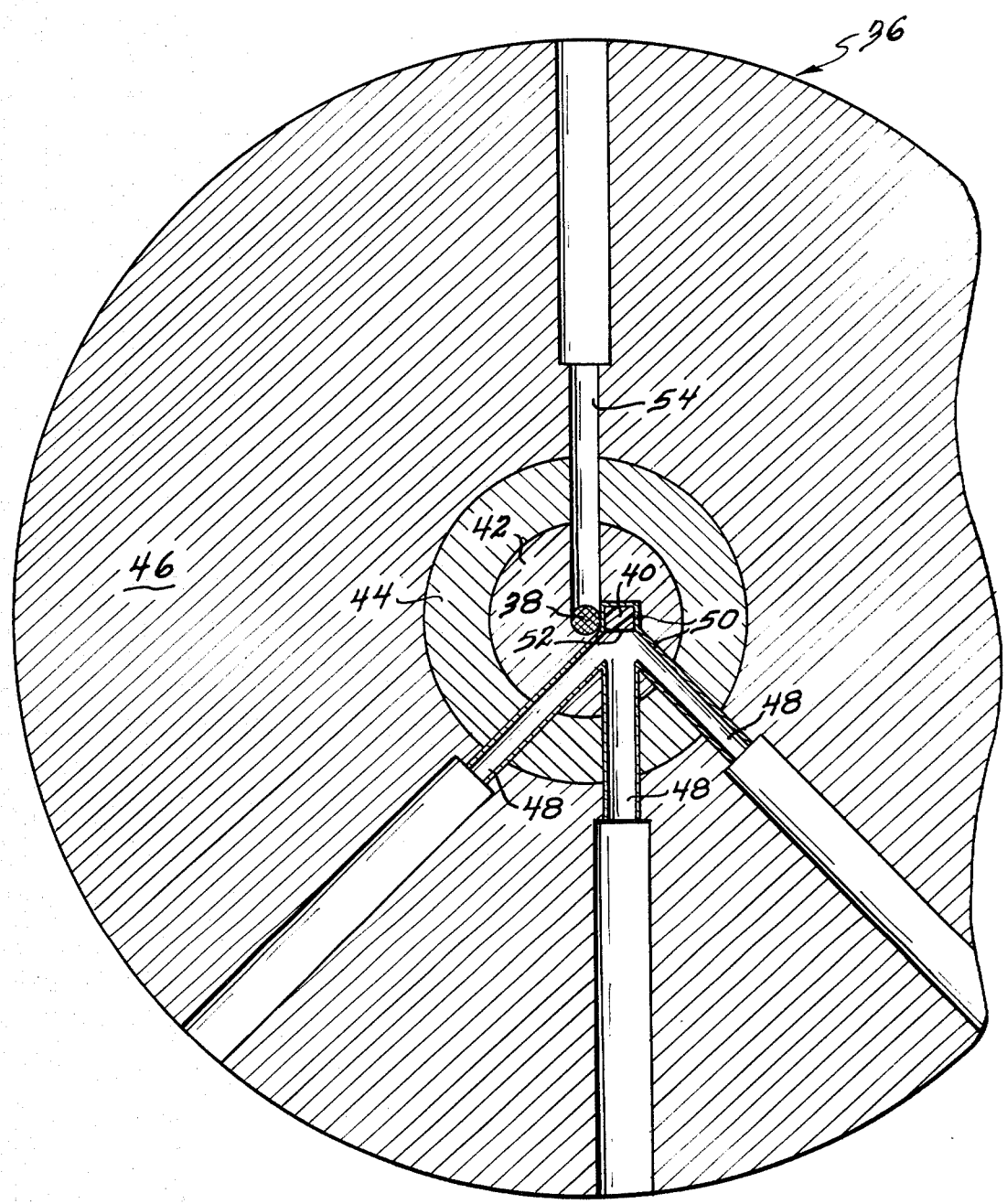
FIG. 4 is a horizontal cross-sectional view of a facility incorporating the present invention.

Referring first to the embodiment shown in FIG. 1, apparatus 10 consists of a pulsed fast neutron source 12 which is disposed within a source well 14. Located adjacent to fast neutron source 12 is moderator block 16 composed of a hydrogenous material such as polyethylene. Surrounding and encasing source 12 and moderator 16 is reflector block 18 composed of a material such as beryllium. Reflector block 18 serves to return into moderator 16 fast neutrons from source 12 which would otherwise leak out of moderator 16 while slowing down, and to deflect into moderator 16 neutrons which would not collide if the reflector block were not present. Thermal neutron exit port 20 extends through reflector block 18 to moderator 16 and serves as the exit passageway from moderator 16 for the high-intensity thermal neutron pulses. Neutron energy-dependent decoupling reflector liner 22 covers the interior surfaces of port 20 and all surfaces of moderator 16 except surface 24 which is viewed by port 20. Reflector liner 22 insures that only those neutrons which have been partially thermalized in reflector block 18 to no lower than the decoupling energy can be returned into moderator 16. Also, the portion of liner 22 which covers the surfaces of port 20 serves to capture and absorb any thermal neutrons exiting from moderator 16 which would strike the surfaces of port 20, resulting thereby in an essentially parallel beam of pulsed thermal neutrons exiting from apparatus 10.

FIG. 2 illustrates a three-dimensional view of the exterior of apparatus 10. As indicated previously, reflector block 18 entirely surrounds and encases the fast neutron source and moderator block except for thermal neutron exit port 20. Also indicated in FIG. 2 is a second port which is proton beam entry port 26. While the present invention is not limited to any particular type of pulsed fast neutron source, one embodiment of the invention, discussed in more detail below, utilizes a spallation target which emits fast neutrons upon interaction with an energetic proton beam. Consequently, in this particular embodiment a proton beam entry port 26 must extend through reflector block 18 to the spallation target, the fast neutron source.

The reflector block is constructed from a material which will slow down fast neutrons which would otherwise escape and which has a low capture cross section so as not to absorb neutrons to any appreciable extent. Preferably, the material should have a high density of nuclei with low atomic mass, so that mean slowing down times and pulse widths are as small as possible. In addition, the mean slowing down distance in the reflector block material should be neither too large nor too small. If this distance is too large as compared to the size of the moderator block, then the reflector block's effectiveness in reflecting neutrons back into the moderator is reduced. If this distance is too small, then its effectiveness in deflecting neutrons into the moderator which otherwise would have missed is reduced. Therefore, beryllium is the preferred material for the reflector block, beryllium having an additional advantage in that neutrons produced by $(n, 2n)$ and $(\gamma, n)$ reactions add to the thermal neutron flux. Beryllium is also relatively easy to handle. Other materials which can be utilized as the reflector block material include heavy water ($D_2O$), high deuteron density materials such as $ND_3$, and possibly heavy metal deuterides such as titanium deuteride.

The moderator block must be capable of thermalizing fast neutrons in a small number of elastic collisions resulting in short neutron lifetimes therein. Therefore, a hydrogenous material with a high density of freely-moving protons is preferred. Materials which would function well as the moderator block are polyethylene, water, solid or liquid methane or ammonia, liquid hydrogen, and heavy metal hydrides. However, some of these materials such as liquid methane and liquid hydrogen present additional problems and difficulties if they are to be utilized as the moderator. Therefore, polyethylene is the preferred material, especially for testing purposes.

The neutron energy-dependent decoupling reflector liner must comprise a material which has a capture cross section such that it will only transmit neutrons at or above a specified decoupling energy as previously explained. Cadmium and possibly gadolinium are good materials for the reflector liner. Therefore, if beryllium is utilized as the reflector block material and cadmium as the energy-dependent decoupling reflector liner, the decoupling energy is about 0.4 eV, and the slowing-down time of fast neutrons to 0.4 eV in beryllium is about 15 μsec. A decoupling energy lower than 0.4 eV would allow neutrons to pass into the moderator which have been in the reflector block for longer than 15 μsec and would thereby increase the thermal neutron pulse width to more than 30 μsec. If liquid $D_2O$ is utilized as the reflector block material, the decoupling energy could be lower than 0.4 eV resulting in an increase in the moderator output, for slowing-down times in $D_2O$ are smaller than in beryllium. For instance, to slow down fast neutrons to 0.4 eV takes only about 8 $\mu$sec in $D_2O$. However, a faster slowing-down time in the reflector block means fewer collisions of the neutrons in the reflector block and therefore fewer chances for deflection to the moderator unless the decoupling energy of the reflector liner is decreased. The reflector liner must be closely adjacent to the moderator to avoid lengthening the pulse width due to the finite flight times of neutrons between the reflector liner and the moderator.

Conveniently, as shown in FIG. 1, the path of the thermal neutrons emerging from the moderator is essentially at right angles to a line intersecting the fast neutron source and the moderator. This is the preferred arrangement wherein the fast neutron source, moderator and thermal neutron exit port are not directly aligned. Such an arrangement is advantageous in that whatever views the uncovered moderator surface through the exit port will not be in a direct line with the fast neutron source. In addition, fast neutrons which pass unthermalized through the moderator will strike the reflector block and possibly be deflected back into the moderator. If the fast neutron source, moderator and exit port were all aligned in a straight line, however, such unthermalized fast neutrons would pass out of the moderator and directly into the thermal neutron exit port. Such a situation would be quite undesirable.

As stipulated previously, the present invention is not limited to any particular type of pulsed fast neutron source. However, FIG. 3 illustrates a particular spallation neutron source-moderator arrangement which can be utilized in the specific embodiment explained below. Spallation target 28 comprises a 15 cm by 10 cm diameter cylinder of depleted $U^{238}$ located 2.5 cm from a 10 cm × 10 cm × 7.65 cm polyethylene moderator block 30. All surfaces of moderator block 30 are covered by a cadmium neutron energy-dependent decoupling reflector liner 32 except surface 34 which is viewed by the thermal neutron exit port (not shown). The pulsed thermal neutron beam exits from moderator 30 by way of surface 34 and is indicated by the arrow and the symbol $I_{Th}$, which represents the thermal neutron beam current per unit solid angle. The $U^{238}$ spallation target 28 is impinged by pulses of 0.5 GeV protons from the injector booster accelerator of the Zero Gradient Synchrotron (ZGS) proton accelerator at Argonne National Laboratory which operates at about $5 \times 10^{12}$ proton/pulse at a repetition rate of 60 Hertz, the pulse width being about 180 nsec maximum. With about 6/7 of all accelerator beam pulses being available for impingement on the $U^{238}$ spallation target, this results in an average fast neutron production of about $5 \times 10^{15}$ n/sec with the peak fast neutron production being about $6.5 \times 10^{20}$ n/sec.

While $U^{238}$ is utilized as the spallation target material in the above example, any spallation target material of heavy nuclei which functions to produce pulses of fast neutrons of about $10^{14}$ n/sec or more at about 100 Hertz can be utilized in the present invention, for example lead-bismuth eutectic. In addition, nonspallation types of fast neutron sources can be utilized with the present invention, such as Bremsstrahlung photoneutron sources, pulsed deuterium-tritium fusion neutron sources or other charged particle neutron sources.

FIG. 4 illustrates a horizontal cross section of an example of a facility 36 which incorporates the present invention. Fast neutron source 38 is located in the center of facility 36. Adjacent to fast neutron source 38 is moderator block 40, while reflector block 42 encases fast neutron source 38 and moderator 40. Completely surrounding reflector block 42 is shielding 44 and shielding 46 which may be constructed from any appropriate shielding material known to the art. Passing through shieldings 44 and 46 and through reflector block 42 are a plurality of thermal neutron exit ports 48. Neutron energy-dependent decoupling reflector liner 50 covers the interior surfaces of ports 48 and all surfaces of moderator block 40 except surface 52 which is viewed by exit ports 48. In addition to being a pulsed thermal neutron source facility, facility 36 can also be utilized as a source of fast neutrons by incorporating a fast neutron exit port 54 in facility 36, port 54 passing through shieldings 44 and 46 and through reflector block 42 so as to view fast neutron source 38. It should be noted that if fast neutron source 38 is a spallation target source, the proton beam entry port would be vertical and therefore is not shown in FIG. 4. In addition to the illustration shown in FIG. 4, several moderator blocks could be served by the fast neutron source 38 with each moderator block being viewed by several thermal neutron exit ports. As can be seen from FIG. 4, the variety of designs and configurations of facilities which could incorporate and utilize the present invention are numerous, and therefore the present invention is not limited to such.

Turning back to FIGS. 1 and 2, a specific embodiment for steady-state testing purposes was constructed in accordance therewith. The moderator was a 4 inch × 4 inch × 2 inch polyethylene block with a density of 0.91 gm/cm³. The pulse full width at half maximum for 0.05 eV thermal neutrons exiting from the moderator would be about 30 $\mu$sec. A 4 inch × 4 inch source well was chosen to simulate the $U^{238}$ spallation source described above for FIG. 3. The 4 inch × 4 inch moderator was chosen since the mean slowing-down distance for fast neutrons in polyethylene is about 10 cm as well as the fact that the range over which the fast neutrons are produced in the fast neutron source is also about 10 cm. The beam port was selected to be 4 inch × 4 inch square due to the choice of the moderator size.

The reflector block was constructed from beryllium and had the outer dimensions of 18 inches × 18 inches × 16 inches. The asymmetric shape was chosen and the dimensions made smaller than optimally desirable in order to minimize the mass of material to be handled, even though the root-mean-square slowing-down distance from 2 MeV to 0.4 eV for fast neutrons in beryllium is about 25 cm. The reflector block was surrounded on five faces with 6 inches of Benelex, a trade-named material which comprises a high-density wood-based composite, and rested above 3 inches of Benelex on a concrete floor, resulting thereby in insignificant room scatter and efficient reflection of neutrons leaking from the reflector block.

The neutron energy-dependent decoupling reflector liner was 0.020 inch cadmium, resulting in as near an optimal choice of apparatus materials as could be easily constructed. As discussed above, the beryllium reflector block - cadmium reflector liner combination resulted in a decoupling energy of about 0.4 eV, for the slowing-down time to 0.4 eV for fast neutrons in beryllium is about 15 $\mu$sec.

In lieu of utilizing a $U^{238}$ spallation source as illustrated in FIG. 3 and described above, unstable isotopes which had been previously accurately calibrated by A. DeVolpe, Inorganic Chemistry Letters, 5, 128 (1968), were utilized as low-intensity fast neutron sources in the measurements for testing and evaluating the above embodiment of the present invention. $Cf^{252}$ with a fission-neutron spectrum and $Am^{241}$—Be with the harder spectrum characteristic of $(\alpha, n)$ sources, were utilized, for they would also enable the determination of the effects of source spectral variation.

Neutron fluxes were measured utilizing the very sensitive solid state track recording (SSTR) method of R. Gold, et al., Nuclear Science and Engineering 34, 13 (1968), using asymptotically thick 93.1 percent enriched uranium fission foils and mica track recorders, for it was determined that steady-state measurements are sufficient to determine the intensity for pulsed moderators for which the pulse shape and energy distribution of the sources are known. Neutrons were incident only through the track recorder side so that no significant self-shielding occurred. Track densities were $10^3$ to $10^5$ tracks/cm$^2$ and were determined by manual counting, with errors of the area of 5 percent assuming Poisson statistics in the numbers of tracks counted.

Both bare and cadmium-covered detectors were irradiated, and two classes of measurements were made. The flux on the moderator surface was measured by detectors placed directly against the surface. Detectors placed 36 cm and 100 cm from the moderator, well shielded against room-scattered neutrons, were used to measure the beam current per unit solid angle. The net sub-cadmium track densities were converted to thermal flux, assuming a spectrum-averaged fission cross section of 439 barns/$U^{235}$, which is characteristic of a spectrum whose temperature, 365°K., is that expected for this polyethylene moderator.

The thermal neutron beam current per unit solid angle, $I_{Th}$, was determined from the track densities of detectors irradiated at a distance down the beam from the thermal neutron exit port. In addition, the average thermal neutron flux, $\phi_{Th\ ave.}$, on the viewed moderator surface, $A_M$, was related to the thermal-neutron beam current per unit solid angle in accordance with equation (1).

$$\phi^{Th\ ave.} = 4.29\ (I_{Th}/A_m \quad (1)$$

The results of the measurements and tests were consistent with the previous calibrations for $Cf^{252}$ and $Am^{241}$—Be. The flux per unit source was about the same for both the $Cf^{252}$ and $Am^{241}$—Be sources, indicating only mild dependence of the yield on the particular source spectrum. The flux distribution appeared to be somewhat tilted toward the source in the case of the $Cf^{252}$ source but was virtually symmetric about the viewed moderator surface's centerline in the case of the $AM^{241}$—Be source.

The cadmium ratio, defined as the track density for bare SSTR/track density for cadmium-covered SSTR, observed at the moderator face appeared to be characteristic of the emerging thermal neutron beam and was observed to be influenced strongly by epicadmium neutrons from the thermal neutron exit port walls. The thermal neutron beam current per unit solid angle seemed to be a little greater than would be expected as seen when the average thermal neutron surface flux calculated from the beam current in accordance with equation (1) was compared with the measured flux on the viewed moderator surface.

Summarizing the results of the measurements, then, the maximum thermal neutron flux at the viewed moderator surface taken as the average of two measurements was $3.2 \times 10^{-4}$ thermal neutrons $(n_{Th})$/cm$^2$/fast neutron $(n_f)$, and the thermal neutron beam current per unit solid angle, averaging three measurements, was $4.1 \times 10^{-3}\ n_{Th}$/steradian/$n_f$. The pulse width at 0.05 eV for the polyethylene moderator was 30 μsec.

The particular embodiment described above having been tested with known neutron sources and found to be completely operable, a $U^{238}$ spallation source, illustrated in FIG. 3 and described above, is placed in the source well. Pulses of 0.5 GeV protons are impinged upon the $U^{238}$ target, creating fast-neutron pulses of about $9.8 \times 10^{13}\ n_f$/pulse. With the invention operating as explained above, a maximum peak thermal neutron flux of about $1.6 \times 10^{15}\ n_{Th}$/cm$^2$—sec is achieved each time the $U^{238}$ spallation target receives a proton pulse, the pulse width for 0.05 eV thermal neutrons being about 30 μsec, and the time average thermal neutron flux is about $2 \times 10^{12}\ n_{Th}$/cm$^2$-sec. This makes the present invention one of the most intense pulsed thermal neutron sources in the world.

Generally, the peak flux of this embodiment would remain roughly unchanged if the moderator were heterogeneously poisoned to reduce the pulse width. In addition, the beryllium reflector block with the energy-decoupling reflector liner provides about a 5 or 10 times enhancement of the peak thermal neutron flux compared to that achievable with a bare moderator.

It should be noted that the reflector block — moderator — reflector liner combination has not been optimized. Therefore, further enhancement of the peak thermal neutron flux is possible. On the other hand, this combination does not incorporate any design requirements for cooling due to heat production resulting from thermal power released in the target from incident proton energy, fissions and other reactions, or allowances to account for thermoelastic shock effect. Such design considerations for cooling will most likely detract from the peak thermal neutron flux. However, it is felt that the increase in peak flux resulting from design optimizations would compensate for the required practical changes for cooling, leaving the peak thermal neutron flux of the present invention at about $1.6 \times 10^{15}\ n_{Th}$/cm$^2$-sec.

It should be further noted that, from the measurements made above, the peak thermal leakage beam current per unit solid angle, integrated over the viewed moderator surface, for 0.05 eV neutrons is about $1.34 \times 10^{16}\ n_{Th}$/steradian-sec, and this quantity is what is required for estimates of performances in beam application.

It will be understood that the invention is not to be limited to the details and specific embodiments given herein but that it may be modified within the scope and spirit of the appended claims.

The embodiments of the invention in which an exclusive property or privilege is claimed are defined as follows:

1. A high-intensity, pulsed thermal neutron source comprising a neutron-producing source which emits pulses of fast neutrons; a moderator block adjacent to the fast neutron source; a reflector block encasing said fast neutron source and said moderator block, said reflector block having a thermal neutron exit port extending therethrough from said moderator block; and a neutron-energy-dependent decoupling reflector liner covering the interior surfaces of said port and all surfaces of said moderator block except the moderator surface viewed by said thermal neutron exit port.

2. The thermal neutron source according to claim 1 wherein said neutron-energy-dependent decoupling reflector liner comprises a material which will capture and absorb neutrons having energies below the decoupling energy and transmit neutrons having energies at or above said decoupling energy, said decoupling energy being related to that energy to which said reflector block will slow down said fast neutrons in a time less than the response time of said moderator block.

3. The thermal neutron source according to claim 2 wherein said decoupling energy is that energy to which said reflector block will slow down said fast neutrons in 15 $\mu$sec.

4. The thermal neutron source according to claim 1 wherein said reflector block comprises a material having a high density of deuterons.

5. The thermal neutron source according to claim 1 wherein said reflector block comprises a material selected from the group consisting of beryllium, heavy water and heavy metal deuterides.

6. The thermal neutron source according to claim 1 wherein said moderator block comprises a material having a high density of protons.

7. The thermal neutron source according to claim 6 wherein said moderator block is selected from the group consisting of polyethylene, water, non-gaseous methane, non-gaseous ammonia, liquid hydrogen and heavy metal hydrides.

8. The thermal neutron source according to claim 1 wherein said neutron-energy-dependent decoupling reflector liner comprises a material having a high capture cross section for absorption of low-energy neutrons.

9. The thermal neutron source according to claim 8 wherein said neutron-energy-dependent decoupling reflector liner is selected from the group consisting of cadmium and gadolinium.

10. A pulsed thermal neutron source capable of emitting high-intensity thermal neutron pulses of about 30 $\mu$sec pulse width comprising a neutron-producing source which emits pulses of fast neutrons; a polyethylene moderator block adjacent to the fast neutron source; a beryllium reflector block encasing said fast neutron source and said polyethylene moderator block, said beryllium reflector block having a thermal neutron exit port extending therethrough from said polyethylene moderator block; and a cadmium neutron-energy-dependent decoupling reflector liner covering the interior surfaces of said port and all surfaces of said polyethylene moderator block except the moderator surface viewed by said thermal neutron exit port.

11. The thermal neutron source according to claim 10 wherein said fast neutron source comprises a spallation target material capable of emitting pulses of fast neutrons upon interaction with energetic pulsed proton beams, and wherein said beryllium reflector block has a proton beam entry port extending therethrough from said spallation target material.

12. The thermal neutron source according to claim 11 wherein said spallation target material comprises a material selected from the group consisting of $U^{238}$ and lead-bismuth eutectic.

13. The thermal neutron source according to claim 12 wherein said fast neutron source comprises $U^{238}$ impinged upon by 0.5 GeV pulsed proton beams.

14. The thermal neutron source according to claim 10 wherein said fast neutron source, said moderator block, said neutron-energy-dependent decoupling reflector liner and said thermal neutron exit port are arranged so that the path of said thermal neutron pulses emerging from said moderator block is essentially at right angles to a line intersecting said fast neutron source and said moderator block.

* * * * *